United States Patent
Ovadia et al.

(10) Patent No.: US 6,882,776 B2
(45) Date of Patent: Apr. 19, 2005

(54) METHOD AND APPARATUS OF A SEMICONDUCTOR-BASED GAIN EQUALIZATION DEVICE FOR OPTICAL AMPLIFIERS

(75) Inventors: Shlomo Ovadia, San Jose, CA (US); Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 10/011,472

(22) Filed: Nov. 6, 2001

(65) Prior Publication Data

US 2003/0086155 A1 May 8, 2003

(51) Int. Cl.$^7$ .............................. G02B 6/34; H04J 14/02
(52) U.S. Cl. ............................. 385/37; 398/84; 398/87
(58) Field of Search ...................... 398/84, 87; 385/37

(56) References Cited

U.S. PATENT DOCUMENTS

| | | | |
|---|---|---|---|
| 4,776,661 A | * 10/1988 | Handa | 385/37 |
| 5,541,766 A | 7/1996 | Mizrahi et al. | |
| 5,583,689 A | 12/1996 | Cassidy et al. | |
| 5,742,416 A | * 4/1998 | Mizrahi | 398/92 |
| 5,912,999 A | * 6/1999 | Brennan et al. | 385/37 |
| 6,049,414 A | 4/2000 | Espindola et al. | |
| 6,266,463 B1 | 7/2001 | Laming et al. | |
| 6,552,845 B1 | 4/2003 | Ishii | |
| 6,590,684 B1 | * 7/2003 | Goodfellow | 385/123 |

FOREIGN PATENT DOCUMENTS

WO     WO 91/18434     11/1991

OTHER PUBLICATIONS

Erdogan, T., "Fiber Grating Spectra", *Journal of Lightwave Technology*, vol. 15, No. 8, pp. 1277–1294, Aug. 1997.

Hill, K. O., "Fiber Bragg Grating Technology Fundamentals and Overview", *Journal of Lightwave Technology*, vol. 15, No. 8, pp. 1263–1276, Aug. 1997.

Studenkov, P.V., "Asymmetric Twin–Waveguide 1.55–$\mu$m Wavelength Laser with a Distributed Bragg Reflector", *IEEE Photonics Technology Letters*, vol. 12, No. 5, pp. 468–470, May 2000.

Willner, A.E., "Tunable Compensation of Channel Degrading Effects Using Nonlinearly Chirped Passive Fiber Bragg Gratings", *IEEE Journals of Selected Topics in Quantum Electronics*, vol. 5, No. 5, pp. 1298–1311, Sep./Oct. 1999.

Giles, C.R., "Lightwave Applications of Fiber Bragg Gratings", *Journal of Lightwave Technology*, vol. 15, No. 8, pp. 1391–1404, Aug. 1997.

(Continued)

*Primary Examiner*—Akm Enayet Ullah
*Assistant Examiner*—Jerry T. Rahll
(74) *Attorney, Agent, or Firm*—Blakely, Sokoloff, Taylor & Zafman LLP

(57) ABSTRACT

A semiconductor-based gain equalization device, method and apparatus. In one aspect of the present invention, an apparatus according to an embodiment of the present invention includes a semiconductor material. An optical path is included through the semiconductor material and is optically coupled to receive and transmit an optical beam. The gain equalization device is disposed in the semiconductor material. The optical gain equalization device includes a plurality of Bragg gratings disposed in the semiconductor material optically coupled to receive and transmit the optical beam. Each of the plurality of Bragg gratings have a different Bragg wavelength. The optical beam is to be directed from plurality of Bragg gratings with a non-uniform spectral response to compensate for the spectral non-uniformity of optical amplifiers.

27 Claims, 9 Drawing Sheets

OTHER PUBLICATIONS

Sugden, K., "Fabrication and Characterization of Bandpass Filters Based on Concatenated Chirped Fiber Gratings", *Journal of Lightwave Technology*, vol. 15, No. 8, pp. 1424–1432, Aug. 1997.

Winch, R.G., "Telecommunication Transmission Systems," McGraw–Hill Pub., TK 5101, W48, (1993), pp. 334–337.

Desurvire, E., "Erbium–Doped Fiber Amplifiers," John Wiley & Sons, Inc., (1994), pp. 480–487.

Li, C.S., et al., "Gain Equalization in Metropolitan and Wide Area Optical Networks Using Optical Amplifiers," IBM T.J. Watson Research Center, P.O. Box 704, Yorktown Heights, NY 10598, IEEE (1994), pp. 130–137.

Wysocki, P.F., "Broad–Band Erbium–Doped Fiber Amplifier Flattened Beyond 40 nm Using Long–Period Grating Filter," IEEE Photonics Technology Letters, vol. 9, No. 10, (Oct. 1997), pp. 1343–1344.

* cited by examiner

METHOD AND APPARATUS OF A SEMICONDUCTOR-BASED GAIN EQUALIZATION DEVICE FOR OPTICAL AMPLIFIERS

BACKGROUND OF THE INVENTION

1. Field of the Invention

The present invention relates generally to optical devices and, more specifically, the present invention relates to gain equalization filters.

2. Background Information

The need for fast and efficient optical-based technologies is increasing as the growth rate of Internet data traffic overtakes that of voice traffic, pushing the need for fiber optic communications. Transmission of multiple optical channels over the same fiber in a dense wavelength-division multiplexing (DWDM) system provides a simple way to use the unprecedented capacity (signal bandwidth) offered by fiber optics. Commonly used optical components in the system include wavelength-division multiplexing (WDM) transmitters and receivers, optical add/drop multiplexers, optical filters such as diffraction gratings, thin-film filters, fiber Bragg gratings, arrayed-waveguide gratings and optical amplifiers such as for example erbium-doped fiber amplifiers (EDFAs).

Optical amplifiers such as EDFAs, which typically operate in the C or L wavelength band, are used to amplify optical signals. Applications for EDFAs include amplifying optical beams over for example long distances in optical communications systems. It is well known that the optical gain of an EDFA exhibits strong wavelength dependence. For instance, a known EDFA has a non-uniform spectral response or a non-flat gain spectrum with gain peaks at approximately 1530 due to amplified spontaneous emission and 1560 nanometers. The non-uniform spectral response of optical amplifiers such as EDFAs presents complexities in optical applications such as transparent DWDM lightwave networks, where multiple channels over a spectrum of wavelengths are included in optical beams. Consequently, different channels in the DWDM lightwave networks are amplified with different optical gain. Another challenge associated with known EDFAs is that the non-uniform spectral response of the output is varied as a function of the optical power of the input optical signal to the EDFA. The problems associated with the non-uniform spectral response of EDFAs are further exacerbated when multiple EDFAs are cascaded. Known solutions to equalize the gain of EDFAs are complicated and typically utilize complex multiple-cavity bandpass Fabry-Perot (FP) filters over the entire C-band (e.g. 1530 to 1565 nanometers).

BRIEF DESCRIPTION OF THE DRAWINGS

The present invention is illustrated by way of example and not limitation in the accompanying figures.

DETAILED DESCRIPTION

Methods and apparatuses for a semiconductor-based gain equalization device for optical amplifiers are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview of the various embodiments of the present invention, semiconductor-based gain equalization devices are provided for optical amplifiers. In one embodiment, the gain equalization device includes a plurality of Bragg gratings included in an optical filter to provide fully integrated solutions on a single integrated circuit chip or semiconductor-based optical platform. In one embodiment, each of the plurality of Bragg gratings have a different Bragg wavelength and are designed to provide a complex non-uniform spectral response to equalize a complex non-uniform spectral response of an optical amplifier. As will be discussed herein, an embodiment of the gain equalization device includes tunable waveguide Bragg gratings. Accordingly, tunable optical filters having adjustable non-uniform spectral responses are provided to adjust for variations in the non-uniform spectral responses of the outputs of optical amplifiers. In one embodiment, a Bragg condition of the tunable waveguide Bragg gratings is tuned by adjusting an effective refractive index along the Bragg grating without making adjustments to the grating pitch of the Bragg grating. In various embodiments, the Bragg gratings are provided in the form, for example, of sampled gratings. Sampled gratings are fabricated by creating a periodic modulation of the refractive index of the grating, generating a multiplicity of resonances.

Figure 1A:
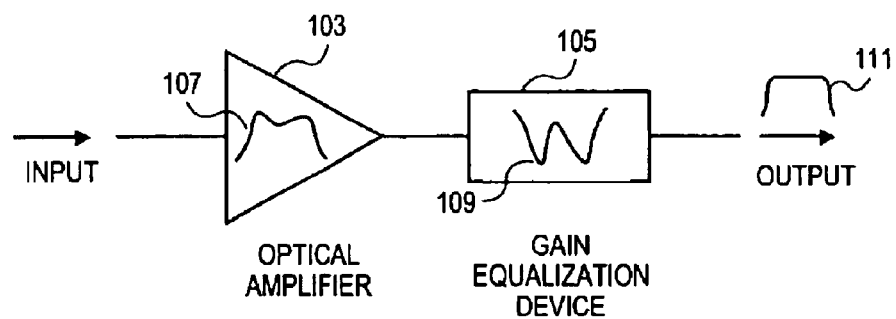
FIG. 1A is a block diagram illustrating an embodiment of an optical communication system including an optical amplifier having a first non-uniform spectral response and an optical gain equalization device having a second non-uniform spectral response in accordance with the teachings of the present invention.

FIG. 1A is a block diagram illustrating generally one embodiment of an optical communication system 101 including an optical amplifier 103 and an gain equalization device 105. As shown, optical amplifier 103 is optically coupled to receive an optical beam and amplify the signal included in the optical beam. The gain spectrum of optical amplifier exhibits a dependence on wavelength, which is illustrated in FIG. 1A as a first non-uniform spectral response 107. In one embodiment, optical amplifier 103 includes a fiber amplifier such as for example an erbium-doped fiber amplifier (EDFA). In one embodiment, the optical beam amplified by optical amplifier 103 includes substantially uniform spectral response 211.

As shown in the depicted embodiment, gain equalization device 105 is optically coupled to optical amplifier 103. In one embodiment, an input of gain equalization device 105 is coupled to an output of optical amplifier 103. As will be discussed, embodiments of gain equalization device 105 include a semiconductor-based optical filter including a plurality of Bragg gratings disposed in semiconductor material. The optical filter of gain equalization device 105 is coupled to receive the optical beam and filter the optical beam with a second non-uniform spectral response 109 to equalize the first non-uniform spectral response 107. As a result of the combination of the first non-uniform spectral response 107 of optical amplifier 103 and the second non-uniform spectral response 109 of gain equalization device 105, optical beam is amplified with a substantially uniform spectral response 111.

Figure 1B:
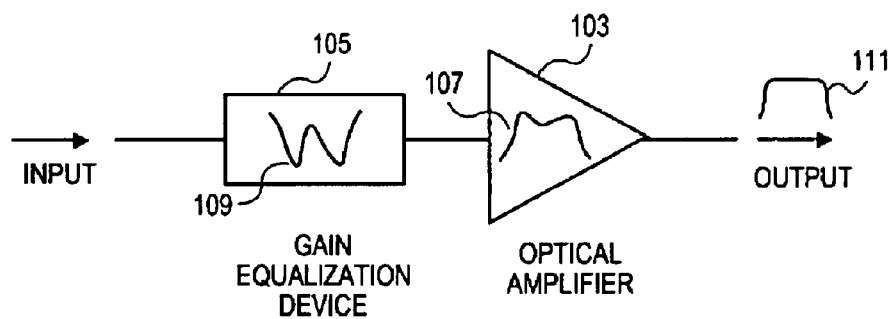
FIG. 1B is a block diagram illustrating another embodiment of an optical communication system including an optical gain equalization device having a second non-uniform spectral response and an optical amplifier having a first non-uniform spectral response in accordance with the teachings of the present invention.

In another embodiment, an output of gain equalization device 105 may be coupled to an input of optical amplifier 103. An example of this embodiment is illustrated in FIG. 1B with optical communication system 151. As shown, optical communication system 151 includes gain equalization device 105, which has second non-uniform spectral response 109. An output of gain equalization device 105 is coupled to an input of optical amplifier 103, which has first non-uniform spectral response 107. Accordingly, the optical beam is output with a resulting substantially uniform spectral response 111.

Figure 2:
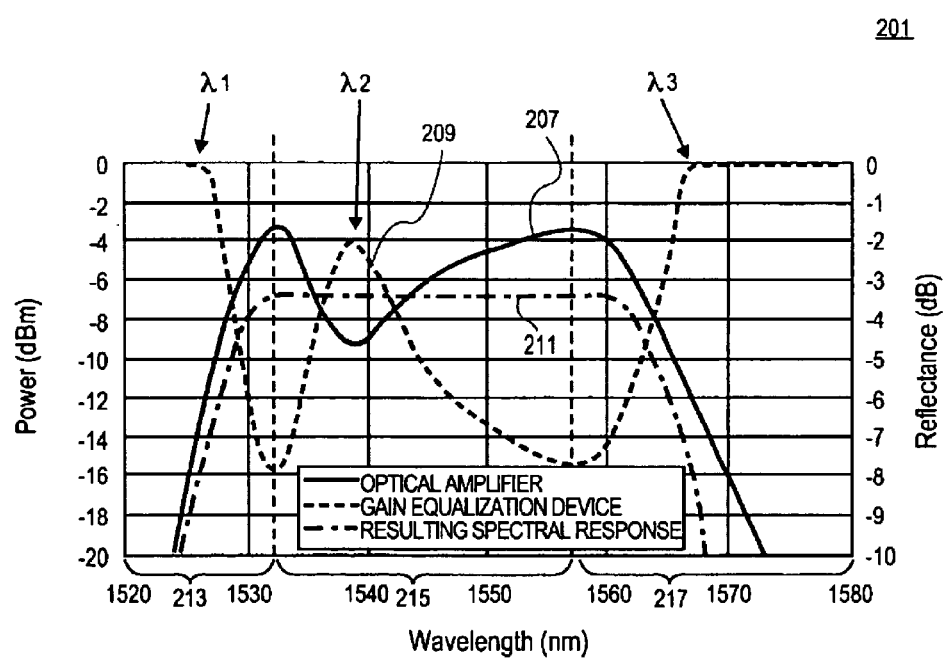
FIG. 2 is a diagram illustrating one embodiment of a first non-uniform spectral response of an optical amplifier, a second non-uniform spectral response of an optical gain equalization device and a resulting substantially uniform spectral in accordance with the teachings of the present invention.

FIG. 2 is a diagram 201 including plots illustrating generally in further detail a relationship between a first non-uniform spectral response 207, a second non-uniform spectral response 209 and a resulting substantially uniform spectral response 211 in accordance with the teachings of the present invention. In one embodiment, first and second non-uniform spectral responses 207 and 209 and substantially uniform spectral response 211 of FIG. 2 may correspond to first and second non-uniform spectral responses 107 and 109 and substantially uniform spectral response 111 of FIGS. 1A and 1B. It is appreciated that the precise plots illustrated in diagram 201 are for explanation purposes and that there may be variations in the plots in accordance with the teachings of the present invention.

In the depicted embodiment, first non-uniform spectral response 207 corresponds to an optical amplifier that is an EDFA with a non-flat gain spectrum in the C-Band. It is appreciated that other types optical amplifiers and/or fiber amplifiers with non-uniform spectral responses may be utilized in other embodiments of the present invention. As shown in the depicted embodiment, first non-uniform spectral response 207 includes an amplified spontaneous emission peak at approximately 1532 nanometers, a minimum at approximately 1538 nanometers and then a stimulated emission peak at approximately 1557 nanometers. In addition, the first non-uniform spectral response 207 drops off rapidly at wavelengths below approximately 1527 nanometers and at wavelengths above approximately 1567 nanometers.

In one embodiment, an optical filter having the complex reflectance spectrum of second non-uniform spectral response 209 will substantially equalize the first non-uniform spectral response 207 to result in substantially uniform spectral response 211 over the C-band. Accordingly, second non-uniform spectral response 209 includes peaks and minimas that correspond to the minimas and peaks, respectively, of first non-uniform spectral response 207.

In one embodiment, the complex reflectance spectrum of second non-uniform spectral response 209 shown in FIG. 2 is provided by dividing the reflectance spectrum into multiple ranges, with each of the ranges having a corresponding peak. In the example shown in FIG. 2, ranges 213, 215 and 217 are divided at the minimas of second non-uniform spectral response 209. Accordingly, range 213 includes wavelengths below approximately 1532 nanometers, range 215 includes wavelengths between approximately 1532 nanometers up to approximately 1557 nanometers and range 217 includes wavelengths greater than approximately 1557 nanometers. As shown in FIG. 2, range 213 includes a peak wavelength $\lambda 1$ of approximately 1527 nanometers, range 215 includes a peak wavelength $\lambda 2$ of approximately 1538 nanometers and range 217 includes a peak wavelength $\lambda 3$ of approximately 1567 nanometers.

Figure 3:
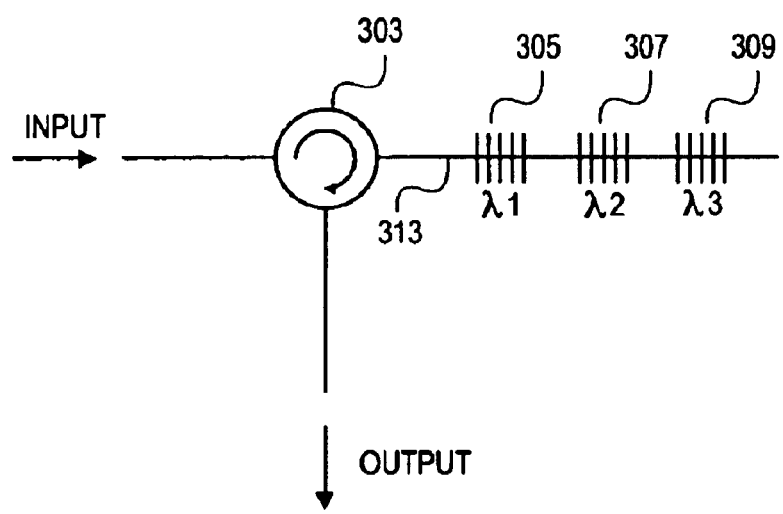
FIG. 3 is a diagram illustrating one embodiment of a gain equalization device in accordance with the teachings of the present invention.

FIG. 3 is a diagram illustrating generally one embodiment of a gain equalization device 301 in accordance with the teachings of the present invention. In one embodiment, gain equalization device 301 may be used in place of gain equalization device 105 of FIGS. 1A and 1B. In one embodiment, gain equalization device 301 provides a complex reflectance spectrum similar to second non-uniform spectral response 209 of FIG. 2. As illustrated in the depicted embodiment, gain equalization device includes a circulator 303 optically coupled to receive an optical beam and direct the optical beam to an optical filter including a plurality of Bragg gratings 305, 307 and 309 in accordance with the teachings of the present invention.

Continuing with the example described above, each of the plurality of Bragg gratings 305, 307 and 309 of the optical filter have different Bragg wavelengths, which correspond to ranges 213, 215 and 217, respectively, of second non-uniform spectral response 209 of FIG. 2. Bragg grating 305 has a Bragg wavelength of $\lambda_1$, Bragg grating 307 has a Bragg wavelength of $\lambda_2$ and Bragg grating 309 has a Bragg wavelength of $\lambda_3$. In one embodiment, Bragg gratings 305, 307 and 309 waveguide Bragg gratings disposed in semiconductor material on the same semiconductor die that are concatenated along a waveguide 313 disposed in the semiconductor material. Thus, the optical beam directed from circulator 303 is directed through waveguide 313 to and through Bragg grating 305, to and through Bragg grating 307 and to through Bragg grating 309. In one embodiment, waveguide 313 is a rib waveguide disposed in the semiconductor material on the same semiconductor die including Bragg gratings 305, 307 and 309. Portions of the optical beam directed from circulator 303 to Bragg gratings 305, 307 and 309 having wavelengths of $\lambda_1$, $\lambda_2$ and $\lambda_3$ are reflected back to circulator 303 through waveguide 313 with a complex reflectance spectrum according to second non-uniform spectral response 209. The reflected portions of the optical beam are then output from circulator 303 as shown.

It is appreciated that the embodiment illustrated in FIG. 3 shows gain equalization device 301 operating in reflection mode. In another embodiment, it is appreciated that gain equalization device 301 may operate in transmission mode in accordance with the teachings of the present invention. In this embodiment, second non-uniform spectral response 209 of FIG. 2 represents the transmission of light through the plurality of Bragg gratings 305, 307 and 309 in accordance with the teachings of the present invention. The Bragg gratings 305, 307, and 309, work as notch optical filters in such an embodiment. In this embodiment, the plurality of Bragg gratings 305, 307 and 309 will transmit the optical beam with a second non-uniform transmission spectral response 209. In this embodiment, circulator 303 is not present and the filtered or equalized optical beam is output from gain equalization device 301 through Bragg grating 309.

Figure 4:
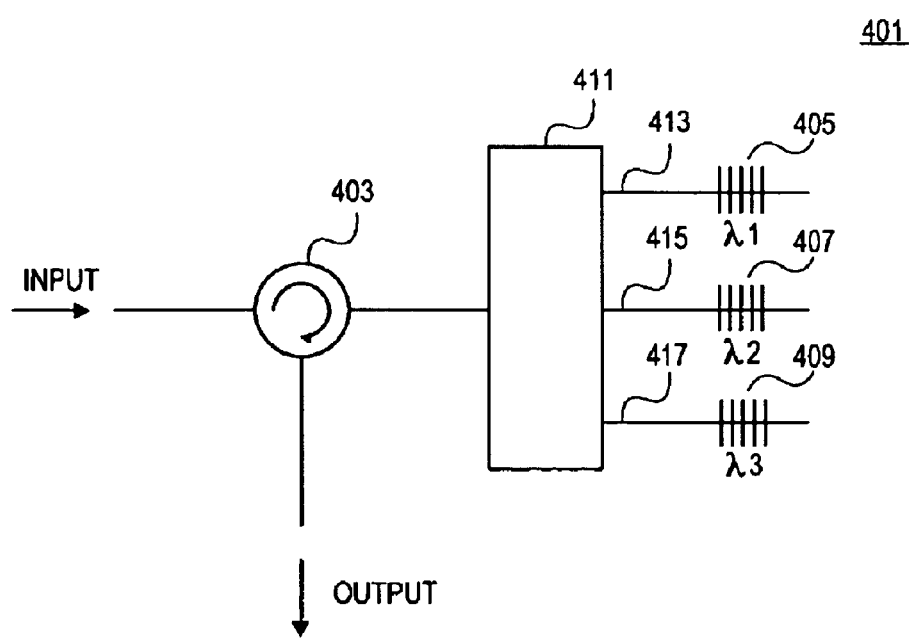
FIG. 4 is a diagram illustrating another embodiment of a gain equalization device in accordance with the teachings of the present invention.

FIG. 4 is a diagram illustrating generally another embodiment of a gain equalization device 401 in accordance with the teachings of the present invention. In one embodiment, gain equalization device 401 may be used in place of 105 of FIGS. 1A and 1B. In one embodiment, gain equalization device 401 includes an optical filter with the complex reflectance spectrum similar to second non-uniform spectral response 209 of FIG. 2. As shown in the depicted embodiment, gain equalization device 401 includes a circulator 403 optically coupled to receive an optical beam and direct the optical beam to an optical filter including an optical element such as an optical multiplexer/demultiplexer 411 and a plurality of Bragg gratings 405, 407 and 409. In particular, optical multiplexer/demultiplexer 411 in one embodiment splits or demultiplexes the optical beam received from circulator 403 into a plurality of beams or a plurality of optical channels with different wavelengths that are separately directed from optical multiplexer/demultiplexer 411 to Bragg gratings 405, 407 and 409 in accordance with the teachings of the present invention. For example, 411 may be a silicon-based arrayed waveguide grating (AWG).

Continuing with the example described above, each of the plurality of Bragg gratings 405, 407 and 409 correspond to ranges 213, 215 and 217, respectively, of second non-uniform spectral response 209 of FIG. 2. Bragg grating 405 has a Bragg wavelength of $\lambda_1$, Bragg grating 407 has a Bragg wavelength of $\lambda_2$ and Bragg grating 409 has a Bragg wavelength of $\lambda_3$. In one embodiment, Bragg gratings 405, 407 and 409 are waveguide Bragg gratings disposed in semiconductor material on the same semiconductor die that are separately optically coupled to optical multiplexer/demultiplexer 411 through separate waveguides 413, 415 and 417, respectively. In one embodiment, waveguides 413, 415 and 417 are a rib waveguides disposed in the semiconductor material on the same semiconductor die including Bragg gratings 405, 407 and 409.

In operation, portions of the split optical beam directed to Bragg gratings 405 having a wavelength of $\lambda_1$ are reflected according to range 213 back to optical multiplexer/demultiplexer 411 through waveguide 413. Portions of the split optical beam directed to Bragg gratings 407 having a wavelength of $\lambda_2$ are reflected according to range 215 back to optical multiplexer/demultiplexer 411 through waveguide 415. Portions of the split optical beam directed to Bragg gratings 409 having a wavelength of $\lambda_3$ are reflected according to range 217 back to optical multiplexer/demultiplexer 411 through waveguide 417. The reflected portions of the optical beams according to ranges 213, 217 and 219 are then recombined or multiplexed into an optical beam to result in a reflected optical beam with a complex reflectance spectrum according to second non-uniform spectral response 209. This reflected optical beam is then directed from optical multiplexer/demultiplexer 411 back to circulator 403 and reflected optical beam is then output from circulator 403 as shown.

It is appreciated that the embodiment illustrated in FIG. 4 shows gain equalization device 401 operating in reflection mode. In another embodiment, it is appreciated that gain equalization device 401 may operate in transmission mode in accordance with the teachings of the present invention. In this embodiment, second non-uniform spectral response 209 of FIG. 2 represents the transmission of light through the plurality of Bragg gratings 405, 407 and 409 in accordance with the teachings of the present invention. In this embodiment, the plurality of Bragg gratings 405, 407 and 409 will transmit the optical beam with a second non-uniform spectral response 209. In this embodiment, the optical beams that are output through Bragg gratings 405, 407 and 409 are recombined or multiplexed to provide the filtered or equalized optical beam output of gain equalization device 401. In this embodiment, circulator 403 is not present.

Figure 5:
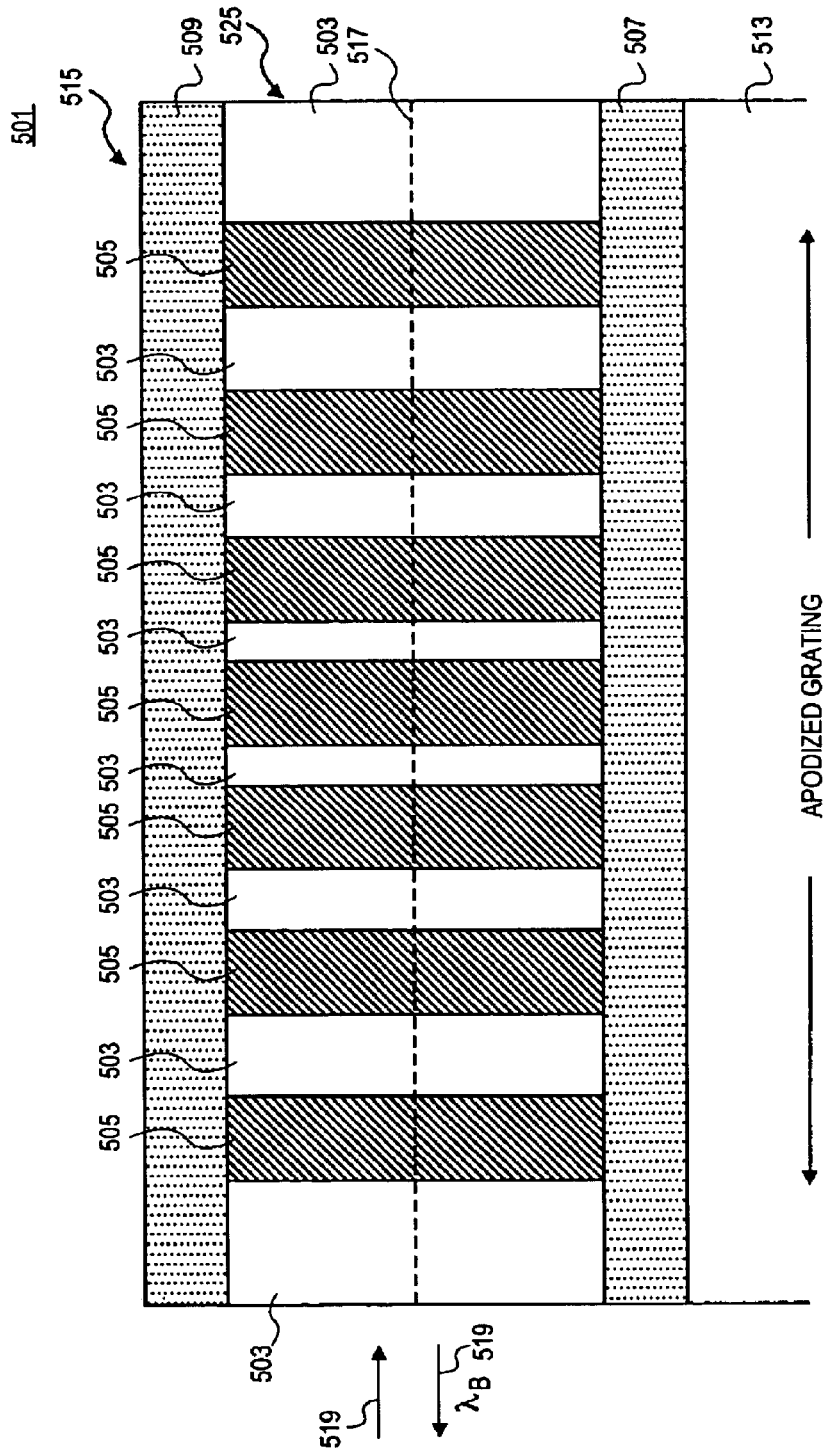
FIG. 5 is a diagram illustrating a cross section of one embodiment of a Bragg grating disposed in a waveguide in a semiconductor material utilized in an optical filter of a gain equalization device in accordance with the teachings of the present invention.

FIG. 5 is a diagram illustrating generally a cross section of one embodiment of a Bragg grating 501 utilized in an optical filter of a gain equalization device in accordance with the teachings of the present invention. In one embodiment, Bragg grating 501 is a sampled grating and maybe used in place of one of the plurality of Bragg gratings 305, 307, 309, 405, 407 or 409 of FIGS. 3 or 4. In the depicted embodiment, Bragg grating 501 of FIG. 5 is silicon-polysilicon grating. It is appreciated that silicon and polysilicon are example materials provided for explanation purposes and that other semiconductor materials including III-V semiconductor materials or the like may be utilized in accordance with the teachings of the present invention. As shown, a plurality of regions of polysilicon 505 are disposed in a silicon semiconductor material 503 such that periodic, quasi-equally spaced perturbations in an effective index of refraction $n_{eff}$ are provided along an optical path 517 through semiconductor material 503.

It is noted that Bragg grating 501 has been illustrated in FIG. 5 with seven polysilicon 205 regions for explanation purposes. It is appreciated that in other embodiments, Bragg grating 501 may include a greater or fewer number of polysilicon 505 regions in accordance with the teachings of the present invention.

In one embodiment in which silicon and polysilicon are utilized, having effective refractive indexes of $n_{Si}$ and $n_{poly}$, respectively, a small effective refractive index difference $\Delta n_{\mathit{eff}}$ (or $n_{poly}-n_{Si}$) is provided at each interface between semiconductor material 503 and polysilicon 505. In one embodiment, $\Delta n_{\mathit{eff}}$ is approximately within the range of 0.005 to 0.03. It is appreciated that other value ranges for $\Delta n_{\mathit{eff}}$ may be utilized in accordance with the teachings of the present invention and that 0.005 to 0.03 is provided herewith for explanation purposes.

As illustrated in FIG. 5, semiconductor material 503 is included in one embodiment in a silicon-on-insulator (SOI) wafer 515. As such, an insulating layer 507 or a buried oxide layer is disposed between semiconductor material 503 and another semiconductor material 513. In one embodiment, an additional insulating layer 509 is included such that semiconductor material 503 is disposed between insulating layers 507 and 509. In one embodiment, insulating layer 509 is an interlayer dielectric layer of the SOI wafer 515. In one embodiment, insulating layers 507 and 509 include an oxide material or the like. As a result, a waveguide 525 including optical path 517 is provided in semiconductor material 503 with cladding provided by insulating layers 507 and 509.

Figure 6:
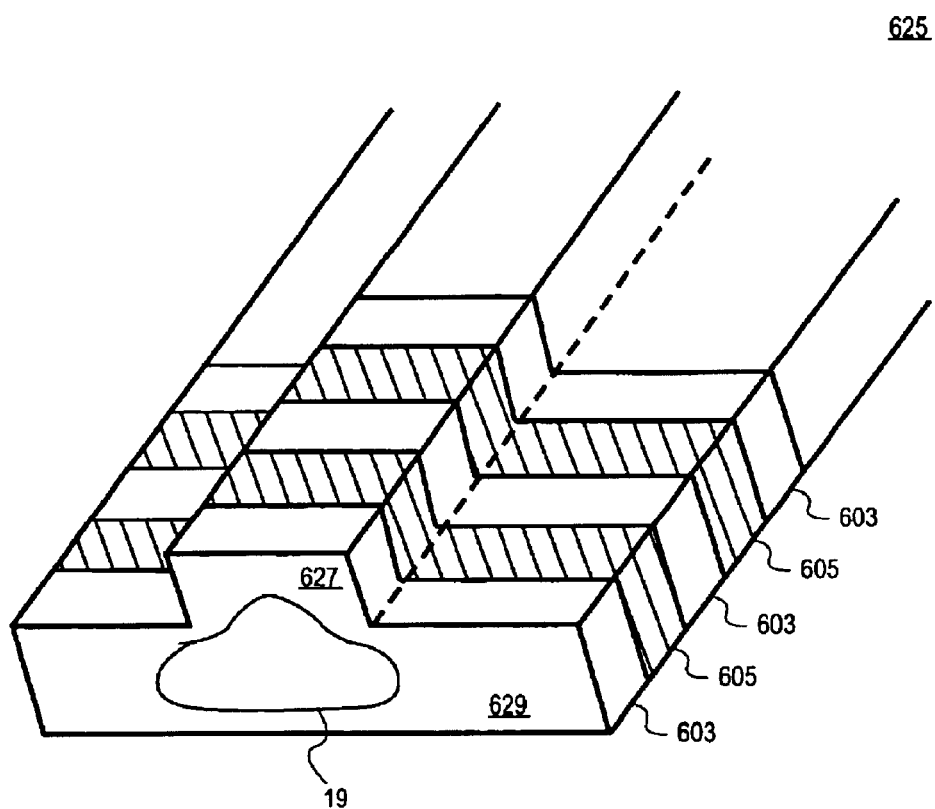
FIG. 6 is a diagram illustrating one embodiment of the peak-to-peak index modulation and the average index for an apodized Bragg grating in accordance with the teachings of the present invention.

In one embodiment, waveguide 525 is a rib waveguide. To illustrate, FIG. 6 is a perspective view illustration showing generally one embodiment of a rib waveguide 625 of a Bragg grating in accordance with the teachings of the present invention. In one embodiment, rib waveguide 625 is disposed between insulating regions 507 and 509 of SOI wafer 515 of FIG. 5.

Referring back to FIG. 6, rib waveguide 625 is disposed in semiconductor material 603 and includes regions of polysilicon 605. In one embodiment, semiconductor material 603 has a different index of refraction than polysilicon 605 such that periodic or quasi-periodic perturbations in an effective index of refraction are provided along an optical path through rib waveguide 625.

As shown, the rib waveguide 625 includes a rib region 627 and a slab region 629. In the embodiment illustrated in FIG. 6, the intensity distribution of a single mode optical beam 619 is shown propagating through the rib waveguide 625. As shown, the intensity distribution of optical beam 619 is such that of the majority of the optical beam 619 propagates through a portion of rib region 627 towards the interior of the rib waveguide 625. In addition, a portion of optical beam 619 propagates through a portion of slab region 629 towards the interior of the rib waveguide 625. As also shown with the intensity distribution of optical beam 619, the intensity of the propagating optical mode of beam 619 is vanishingly small at the "upper corners" of rib region 627 as well as the "sides" of slab region 629.

Referring back to the illustration in FIG. 5, an optical beam 519 is directed along optical path 517 into one end of waveguide 525. In one embodiment, optical beam 519 is received from an optical amplifier such as for example optical amplifier 103 of FIGS. 1A and 1B. In one embodiment, optical beam 519 includes infrared or near infrared light and is confined with cladding provided by insulating layers 507 and 509 to remain within waveguide 525 along optical path 217. It is appreciated that silicon and polysilicon are partially transparent to infrared or near infrared light. Optical beam 519 is confined to remain within waveguide 525 as a result of total internal reflection since the oxide material of insulating layers 507 and 509 has a smaller index of refraction than the semiconductor material of semiconductor material 503 and polysilicon 505.

As mentioned above, there are periodic, quasi-equally spaced perturbations in an effective index of refraction along optical path 517 through waveguide 525. As a result of the effective refractive index difference $\Delta n_{\mathit{eff}}$ described above, a multiple reflection of optical beam 519 occurs at the interfaces between semiconductor substrate 503 and polysilicon 505 along optical path 517. In one embodiment, a Bragg reflection occurs when a Bragg condition or phase matching condition is satisfied. For uniform Bragg gratings, when the condition $$m\lambda_B = 2n_{\mathit{eff}}\Lambda, \quad \text{(Equation 1)}$$

is satisfied, where m is the diffraction order, $\lambda_B$ is the Bragg wavelength, $n_{\mathit{eff}}$ is the effective index of the waveguide and $\Lambda$ is the spatial period of the grating, a Bragg reflection occurs.

In one embodiment, the reflected portions of optical beam 519 matching the Bragg condition, or Bragg wavelength $\lambda_B$ are directed back out of waveguide 525 according to for example the particular range 213, 215 or 217 of second non-uniform spectral response 209. In addition, the remainder of optical beam 519 continues to propagate along optical path 517 through waveguide 525. For an embodiment in which Bragg grating 501 is operating in transmission mode as discussed above, the remainder of optical beam 519 that continues to propagate through waveguide 525 is filtered according to for example the particular range 213, 215 or 217 of second non-uniform spectral response 209.

Figure 7:
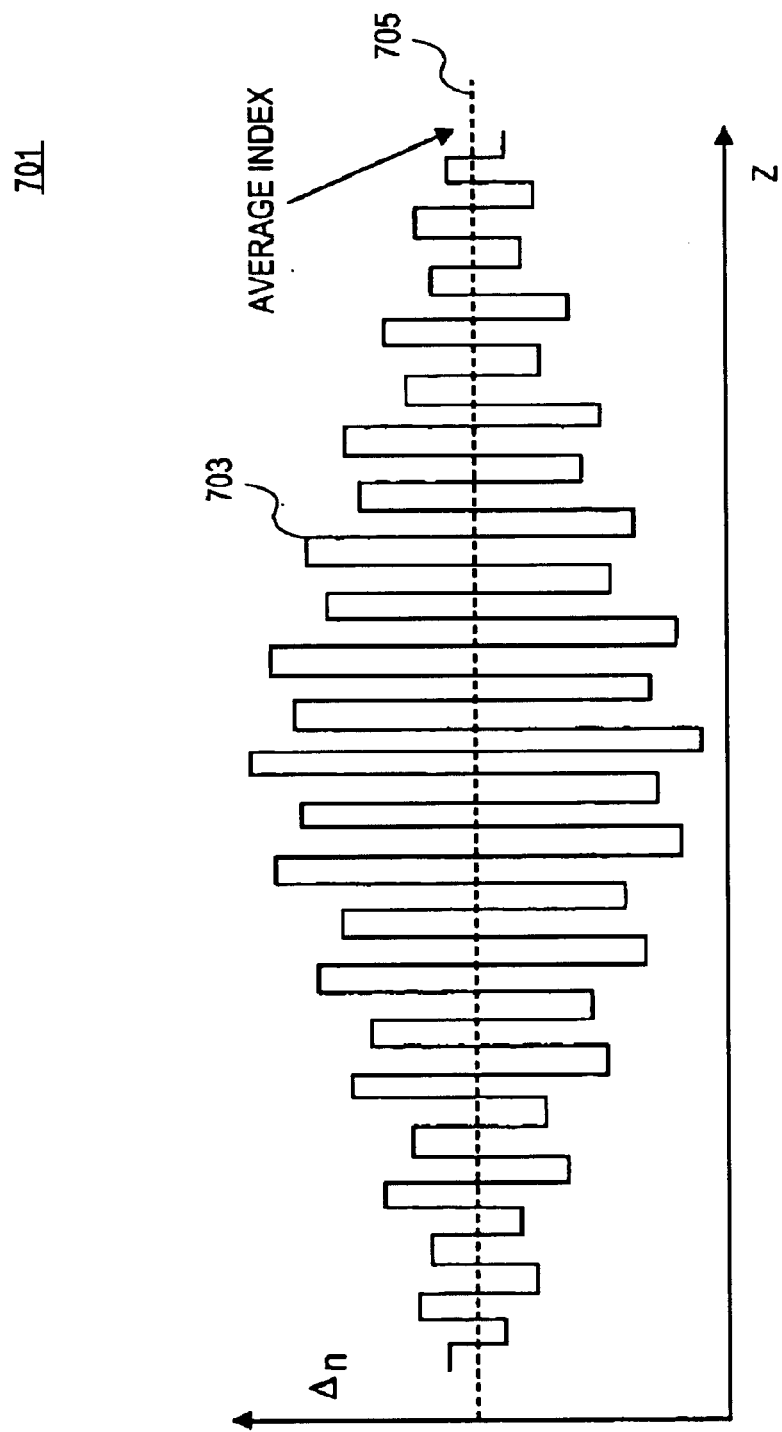
FIG. 7 is a perspective diagram illustrating an embodiment of a Bragg grating disposed in a semiconductor material including a rib waveguide in accordance with the teachings of the present invention.

In one embodiment, Bragg grating 501 is an apodized grating. Accordingly, multiple side-lobes of the central lobe of the Bragg wavelength $\lambda_B$ are reduced or eliminated from second non-uniform spectral response 209. It is appreciated that side-lobes are typically undesirable, particularly in embodiments in which multiple Bragg gratings are concatenated. FIG. 7 is a diagram 701 illustrating generally one embodiment of a peak-to-peak index modulation 703 and an average index 705 for an apodized Bragg grating along the optical propagation direction (e.g., z-axis) of a Bragg grating in accordance with the teachings of the present invention. As shown in the depicted embodiment, the envelope of the index variations of peak-to-peak index modulation 703 has a Gaussian shape and the average index 705 is substantially constant along the z-axis. By keeping a substantially constant average index of refraction along the z-axis of the Bragg grating, the local Bragg wavelength $\lambda_B$ remains substantially unchanged along the length of the Bragg grating.

In one embodiment, index variations as illustrated with peak-to-peak index modulation 703 may be generated, for example, by first reducing the thickness of adjacent polysilicon trenches relative to a center trench, and then slightly increasing the thickness of the following polysilicon trenches. This pattern is repeated such that the narrowest polysilicon trenches are at either side of the grating.

Figure 8:
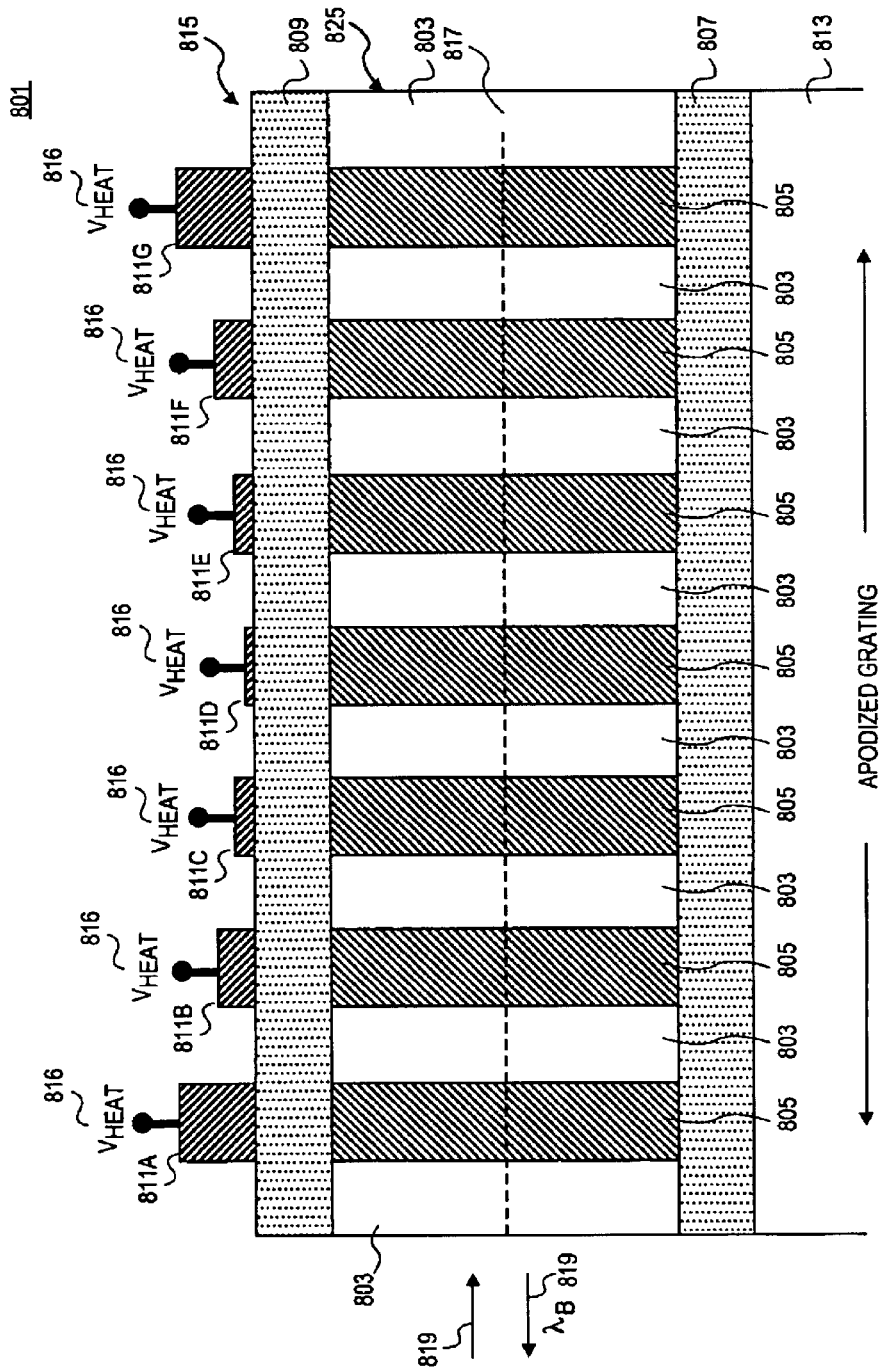
FIG. 8 is a diagram illustrating a cross section of another embodiment of a Bragg grating disposed in a waveguide in a semiconductor material including a plurality of heaters utilized in an optical filter of a gain equalization device in accordance with the teachings of the present invention.

FIG. 8 is a diagram illustrating generally a cross section of another embodiment of a Bragg grating 801 disposed in a waveguide 825 in a semiconductor material 803 including a plurality of heaters 816 in accordance with the teachings of the present invention. In one embodiment, Bragg grating 801 is a sampled Bragg grating and may be included in an optical filter of a gain equalization device in accordance with the teachings of the present invention. In the depicted embodiment, Bragg grating 801 of FIG. 8 is a silicon-polysilicon grating having substantially uniform spacing. As shown, a plurality of regions of polysilicon 805 are disposed in a silicon semiconductor material 803 such that periodic or quasi-periodic perturbations in an effective index of refraction $n_{\mathit{eff}}$ are provided along an optical path 817 through semiconductor material 803.

Similar to the embodiment of Bragg grating 501 illustrated in FIG. 5, semiconductor material 803 is included in one embodiment an SOI wafer 815. As such, an insulating layer 807 or a buried oxide layer is disposed between semiconductor material 803 and another semiconductor material 813. In one embodiment, an additional insulating layer 809 is included such that semiconductor material 803 is disposed between insulating layers 807 and 809. As a result, a waveguide 825 including optical path 817 is provided in semiconductor material 803 with cladding provided by insulating layers 807 and 809. In one embodiment, waveguide 825 is a rib waveguide, similar to rib waveguide 625 illustrated in FIG. 6.

As shown in the depicted embodiment, Bragg grating 801 includes a plurality of heaters 811A, 811B, 811C, 811D, 811E, 811F and 811G arranged along waveguide 825. It is noted that Bragg grating 801 has been illustrated in FIG. 8 with seven heaters 811A, 811B, 811C, 811D, 811E, 811F and 811G for explanation purposes. It is appreciated that in other embodiments, Bragg grating 801 may include a greater or a fewer number of heaters in accordance with the teachings of the present invention.

In one embodiment, the plurality of heaters have varying dimensions such as for example thickness, height, width, etc., or may be made of different materials to provide a temperature gradient along Bragg grating 801. In one embodiment, the plurality of heaters 811A, 811B, 811C, 811D, 811E, 811F and 811G include thin-film heaters or the like or other future arising technology to control the temperature of semiconductor substrate 803 and polysilicon 805 in waveguide 825 along optical path 817.

Silicon and polysilicon have large index of refraction variations with temperature on the order of approximately $2 \times 10^{-4}/°$ K. It is appreciated that the index of refraction variations with temperature for semiconductor materials such as silicon and/or polysilicon are two orders of magnitude greater than other materials such as for example silica or the like. Thus, by controlling the temperature of semiconductor substrate 803 and polysilicon 805, relatively significant shifts in the index of refraction along optical path 817 are provided in accordance with the teachings of the present invention.

In one embodiment, the temperature gradient along optical path 817 is varied to result in Bragg grating 801 being an apodized grating having for example index modulations as illustrated with peak-to-peak index modulation 603 in accordance with the teachings of the present invention. In one embodiment, the Bragg condition $\lambda_B$ may be varied or adjusted by varying the temperature along the optical path 817 of waveguide 825 to vary the effective index of refraction $n_{eff}$, which varies the "$2n_{eff}$" term of Equation 1. Accordingly, the Bragg condition $\lambda_B$ is adjusted without having to adjust the spatial period $\Lambda$ of Bragg grating 801. In one embodiment, the Bragg condition $\lambda_B$ is varied to adjust second non-uniform spectral response 209. For instance, the first non-uniform spectral response 207 of the output of for example optical amplifier 103 may be varied as a function of the optical power of the input optical signal. Accordingly, adjustments to the second non-uniform spectral response 209 may be made in accordance with the teachings of the present invention by adjusting the temperature gradient along Bragg grating 801.

In operation, an optical beam 819 is directed into waveguide 825 and reflected portions of optical beam 819 matching the Bragg condition are reflected. In one embodiment, the optical beam 819 directed into waveguide 825 is received from an optical amplifier and the reflected portions of optical beam 819 matching the Bragg condition are directed back out of waveguide 825 according to for example the particular range 213, 215 or 217 of second non-uniform spectral response 209. In addition, the remainder of optical beam 819 continues to propagate along optical path 817 through waveguide 825.

In one embodiment, the plurality of heaters 811A, 811B, 811C, 811D, 811E, 811F and 811G are responsive to a control signal $V_{HEAT}$ 816 to adjust the temperature along the optical path 817 of waveguide 825. In another embodiment, each of the plurality of heaters 811A, 811B, 811C, 811D, 811E, 811F and 811G have similar dimensions and a separate control signal $V_{HEAT}$ 816 is applied to each respective heater. In such an embodiment, each of the separate one of the control signals $V_{HEAT}$ 816 are set to values that will result in the plurality of heaters 811A, 811B, 811C, 811D, 811E, 811F and 811G providing a temperature gradient along Bragg grating 801.

Figure 9:
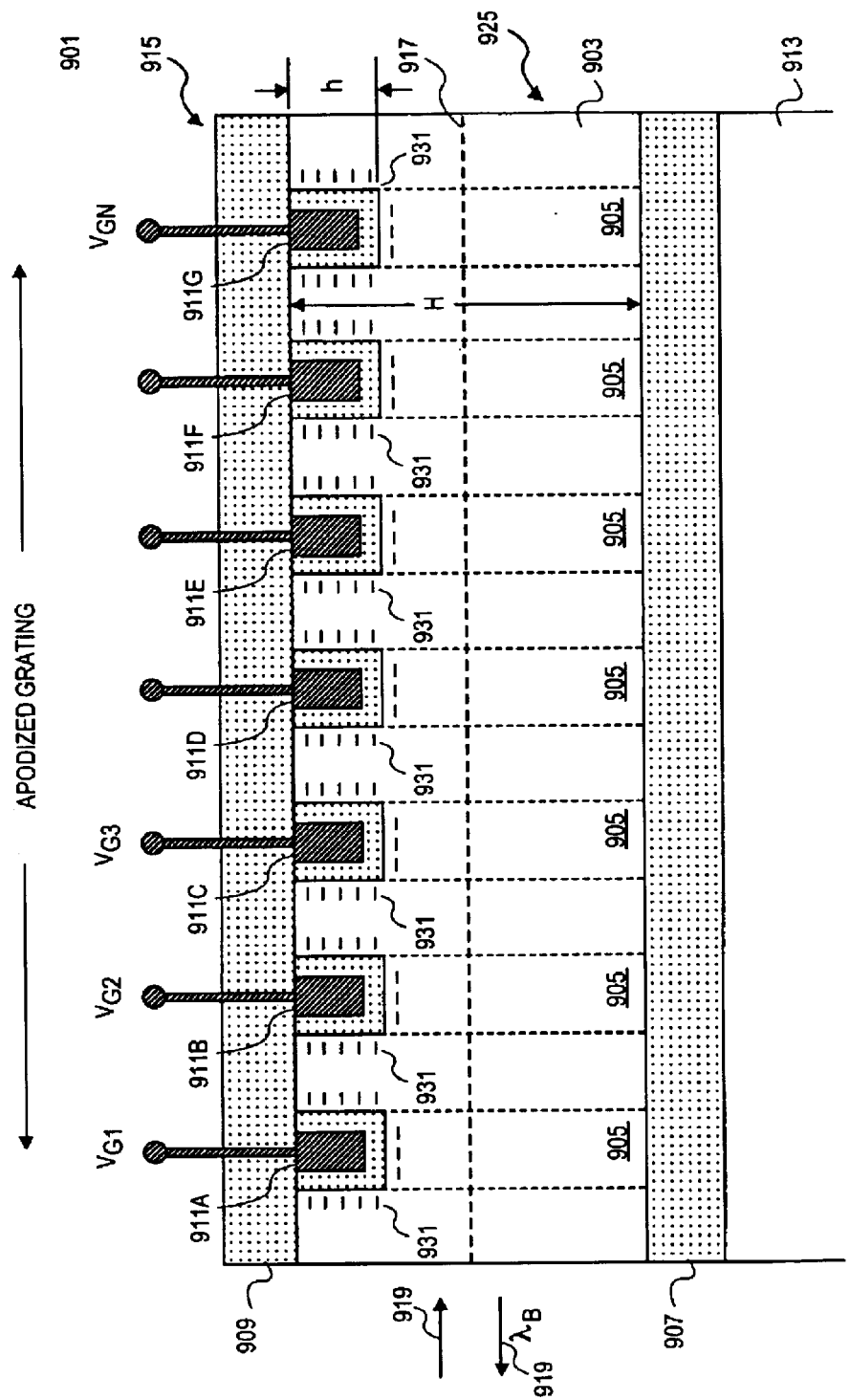
FIG. 9 is a diagram illustrating a cross section of another embodiment of a Bragg grating disposed in a waveguide in a semiconductor material including a plurality of charge modulated regions utilized in an optical filter of a gain equalization device in accordance with the teachings of the present invention.

FIG. 9 is a diagram illustrating generally a cross section of another embodiment of a Bragg grating 901 disposed in a waveguide 925 in semiconductor material including a plurality of charge modulated regions 931 in accordance with the teachings of the present invention. In one embodiment, Bragg grating 901 is a sampled Bragg grating and may be included in an optical filter of a gain equalization device in accordance with the teaching of the present invention.

As shown in the depicted embodiment, Bragg grating 901 includes semiconductor material 903 having an optical path 917 through which an optical beam 919 is directed. In one embodiment, semiconductor material 903 is included in an SOI wafer 915 such that semiconductor material 903 is disposed between a buried insulating layer 907 and insulating layer 909. In addition, buried insulating layer 907 is disposed between semiconductor material 903 and semiconductor material 913. In one embodiment, an optical waveguide 925 is provided with semiconductor material 903 with insulating layers 907 and 909 serving as cladding to confine optical beam 919 to remain within waveguide 925. In one embodiment, waveguide 925 is a rib waveguide, similar to rib waveguide 625 illustrated in FIG. 6.

In the embodiment depicted in FIG. 9, an apodized Bragg grating 901 is provided with a plurality of insulated electrodes 911A, 911B, 911C, 911D, 911E, 911F and 911G distributed along a semiconductor material 903. Accordingly, a plurality of conductor-insulator-semiconductor structures, similar to, for example, metal-oxide-semiconductor (MOS) structures, are disposed along optical path 917 in semiconductor material 903. It is noted that Bragg grating 901 has been illustrated in FIG. 9 with seven insulated electrodes 911A, 911B, 911C, 911D, 911E, 911F and 911G for explanation purposes. It is appreciated that in other embodiments, Bragg grating 901 may include a greater or a fewer number of insulated electrodes in accordance with the teachings of the present invention.

As shown in the depicted embodiment, insulated electrodes 911A, 911B, 911C, 911D, 911E, 911F and 911G are coupled to receive modulation signals $V_{G1}$, $V_{G2}$, $V_{G3}$ ... $V_{GN}$, respectively, through insulating layer 909. As shown in FIG. 9, the height of each insulated electrode structures in waveguide 925 is h. In one embodiment, the height h of the structures 915 is chosen such that propagation loss of optical beam 917 in waveguide 925 along optical path 517 is acceptable.

In the embodiment depicted in FIG. 9, periodic or quasi-periodic perturbations in an effective index $n_{eff}$ of refraction are provided along an optical path 917 through waveguide 925 in semiconductor material 903. In the illustrated embodiment, the effective index of refraction $n_{eff}$ is related or equal to a function of the geometry of waveguide 925 along optical path 917 as well as the index of refraction of the specific medium (e.g. $n_{Si}$) and the wavelength or wavelengths λ included in optical beam 919. As shown in FIG. 9, the height of waveguide 925 in the portions not including the insulated electrode structures is H. Accordingly, assuming semiconductor material 903 includes silicon, the effective index of refraction $n_{eff}$ is a function of the height H of waveguide 925 in the portions not including the insulated electrode structures, $n_{Si}$ and λ. In the regions 905 of waveguide 925 including the insulated electrode structures, the effective index of refraction $n'_{eff}$ is a function of the height (H-h) of waveguide 925, $n_{Si}$ and λ. Thus, the difference in effective index of refraction $$\Delta n_{eff} = n_{eff} - n'_{eff} \qquad \text{(Equation 2)}$$

In the depicted embodiment, insulated electrodes 911A, 911B, 911C, 911D, 911E, 911F and 911G are biased in response to modulation signals $V_{G1}$, $V_{G2}$, $V_{G3}$ ... $V_{GN}$, respectively. Thus, there is an increased concentration of free charge carriers in charge modulated regions 931 in the semiconductor material 903 proximate to insulated electrode structures 911A, 911B, 911C, 911D, 911E, 911F and 911G. For example, assuming a positive voltage is applied with modulation signals $V_{G1}$, $V_{G2}$, $V_{G3}$ ... $V_{GN}$, electrons in semiconductor material 903 are swept into charge-modulated regions 931. When for example less positive voltage is applied to the insulated electrode structures 911A, 911B, 911C, 911D, 911E, 911F and 911G, the concentration of free charge carriers swept into charge-modulated regions 931 is reduced.

It is noted that for explanation purposes, charge modulated regions 931 have been illustrated using electrons or negative charge. It is appreciated that in another embodiment, the polarities of these charges and the voltages of modulation signals $V_{G1}$, $V_{G2}$, $V_{G3}$ ... $V_{GN}$ may be reversed. Thus, in such an embodiment, holes or positive charge carriers are swept into charge-modulated regions 931 in accordance with the teachings of the present invention. In another embodiment, the polarities of modulation signals $V_{G1}$, $V_{G2}$, $V_{G3}$ ... $V_{GN}$ may be alternated in accordance with the teachings of the present invention.

In one embodiment, the effective index of refraction $n_{eff}$ in charge-modulated regions 931 is modulated in response to modulation signals $V_{G1}$, $V_{G2}$, $V_{G3}$ ... $V_{GN}$ due to the plasma optical effect. The plasma optical effect arises due to an interaction between the optical electric field vector and free charge carriers that may be present along the optical path 917 of the optical beam 919. The electric field of the optical beam 919 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the electric field, and also lead to absorption of the optical field as optical energy is used up. Generally the refractive index perturbation is a complex number with the real part is related to the group velocity change and the imaginary part is related to the free charge carrier absorption. In the case of the plasma optical effect in silicon, the effective change in the index of refraction $\Delta n_{eff}$ due to the free electron ($\Delta N_e$) and hole ($\Delta N_h$) concentration change is given by:

$$\Delta n_{eff} = -\frac{e^2 \lambda^2}{8\pi^2 c^2 \varepsilon_0 n_0}\left(\frac{\Delta N_e}{m_e^*} + \frac{\Delta N_h}{m_h^*}\right) \qquad \text{(Equation 3)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively.

In one embodiment, the concentration of free charge carriers swept into each of the charge modulated regions 931 is responsive to the voltages of modulation signals $V_{G1}$, $V_{G2}$, $V_{G3}$ ... $V_{GN}$. Accordingly, the effective index of refraction $n_{eff}$ provided along optical path 917 through semiconductor material 903 is responsive to modulation signals $V_{G1}$, $V_{G2}$, $V_{G3}$ ... $V_{GN}$. In one embodiment, the voltages of modulation signals $V_{G1}$, $V_{G2}$, $V_{G3}$ ... $V_{GN}$ that are applied across the insulated electrodes 911A, 911B, 911C, 911D, 911E, 911F and 911G along waveguide 925 have a voltage gradient to provide an apodized grating. Thus, the concentration of free charge carriers swept into each of the charge-modulated regions 931 varies along waveguide 925 to provide the apodized-grating characteristic of Bragg grating 901.

In one embodiment, the Bragg condition $\lambda_B$ is varied by varying the voltages of modulation signals $V_{G1}$, $V_{G2}$, $V_{G3}$ ... $V_{GN}$ to vary the effective index of refraction $n_{eff}$, which varies the "$2n_{eff}$" term of Equation 1. Accordingly, the Bragg condition $\lambda_B$ is adjusted without having to adjust the spatial period Λ of Bragg grating 901. In one embodiment, the Bragg condition $\lambda_B$ is varied to adjust second non-uniform spectral response 209 to for example adjust for variations in the first non-uniform spectral response 207 of the output of for example an optical amplifier 103.

In operation, an optical beam 919 is directed into waveguide 925 and reflected portions of optical beam 919 matching the Bragg condition are reflected. In one embodiment, the optical beam 919 directed into waveguide 925 is received from an optical amplifier and the reflected portions of optical beam 919 matching the Bragg condition are directed back out of waveguide 925 according to for example the particular range 213, 215 or 217 of second non-uniform spectral response 209. In addition, the remainder of optical beam 919 continues to propagate along optical path 917 through waveguide 925.

In one embodiment, it is appreciated that relatively low voltages are utilized for modulation signals $V_{G1}$, $V_{G2}$, $V_{G3}$ ... $V_{GN}$. For instance, voltages in the range of for example 5 to 15 volts are used for modulation signals $V_{G1}$, $V_{G2}$, $V_{G3}$ ... $V_{GN}$ in one embodiment. In another embodiment, the spacing between each of the insulated electrodes 911A, 911B, 911C, 911D, 911E, 911F and 911G along waveguide 925 is varied such that the spacing between each of the insulated electrodes results in an apodized grating. In such an embodiment, each of the modulation signals $V_{G1}$, $V_{G2}$, $V_{G3}$ ... $V_{GN}$ may have similar or uniform voltages since the apodization of Bragg grating 901 in waveguide 925 will be realized by the spacing between insulated electrodes 911A, 911B, 911C, 911D, 911E, 911F and 911G.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a semiconductor material;
   an optical path through the semiconductor material, the optical path optically coupled to receive an optical beam; and
   an optical filter disposed in the semiconductor material, the optical path including the optical filter, the optical filter including a plurality of Bragg gratings disposed in the semiconductor material optically coupled to receive the optical beam, each of the plurality of Bragg gratings having a different Bragg wavelength, the optical beam to be directed from the optical filter with a non-uniform spectral response in response to the plurality of Bragg gratings,
   wherein each of the plurality of Bragg gratings includes a plurality of perturbations of a refractive index in the semiconductor material along the optical path, wherein the plurality of perturbations of the refractive index are provided with regions of silicon and polysilicon disposed in the semiconductor material along the optical path of each one of the plurality of Bragg gratings.

2. The apparatus of claim 1 wherein each of the plurality of Bragg gratings are concatenated along a waveguide disposed in the semiconductor material.

3. The apparatus of claim 2 further comprising a circulator optically coupled to the concatenated plurality of Bragg gratings, the circulator optically coupled to receive the optical beam and direct the optical beam to the concatenated plurality of Bragg gratings, the circulator optically coupled to receive the optical beam directed from the concatenated plurality of Bragg gratings with the non-uniform spectral response in response to the plurality of Bragg gratings.

4. The apparatus of claim 2 wherein the waveguide comprises a rib waveguide.

5. The apparatus of claim 1 wherein the optical filter comprises:
   an optical multiplexer/demultiplexer optically coupled to receive and transmit the optical beam; and
   a plurality of waveguides disposed in the semiconductor material optically coupled to the optical multiplexer/demultiplexer, each of the plurality of waveguides including a respective one of the plurality of Bragg gratings and optically coupled to receive and transmit the optical beam.

6. The apparatus of claim 5 further comprising a circulator optically coupled to the optical multiplexer/demultiplexer, the circulator optically coupled to receive and transmit the optical beam and direct the optical beam to the optical multiplexer/demultiplexer, the circulator optically coupled to receive and transmit the optical beam directed from the optical multiplexer/demultiplexer with the non-uniform spectral response in response to the plurality of Bragg gratings.

7. The apparatus of claim 5 wherein each of the plurality of waveguides comprises a respective rib waveguide disposed in the semiconductor material.

8. The apparatus of claim 1 wherein the optical beam includes said one or more optical channels centered in wavelength bands located within a range of approximately 1530 to 1565 nanometers.

9. The apparatus of claim 1 wherein each one of the plurality of Bragg gratings is an apodized Bragg grating.

10. The apparatus of claim 1, further including a plurality of adjustable heaters disposed proximate to each one of the plurality of Bragg gratings to adjust a temperature in the semiconductor material along the optical path of each one of the plurality of Bragg gratings, wherein an effective index of refraction along the optical path of each one of the plurality of Bragg gratings is responsive to the temperature along the optical path of each one of the plurality of Bragg gratings.

11. The apparatus of claim 10 wherein the non-uniform spectral response of the optical filter is coupled to be adjusted in response to the temperature in the semiconductor material along the optical path of each one of the plurality of Bragg gratings.

12. The apparatus of claim 1 wherein the plurality of perturbations of the refractive index are provided with a plurality of adjustable charge-modulated regions disposed in the semiconductor material along the optical path of each one of the plurality of Bragg gratings, the plurality of adjustable charge modulated regions provided with a plurality of insulated electrodes distributed along the optical path of each one of the plurality of Bragg gratings.

13. The apparatus of claim 12 wherein the non-uniform spectral response of the optical filter is coupled to be adjusted in response to plurality of adjustable charge-modulated regions along the optical path of each one of the plurality of Bragg gratings.

14. A method, comprising:
   directing an optical beam through a semiconductor material to a plurality of Bragg gratings disposed in the semiconductor material, each one of the plurality of Bragg gratings having a different Bragg wavelength; and
   directing different portions of the optical beam from each one of the plurality of Bragg gratings in response to the different Bragg wavelengths, wherein the optical beam is directed from the semiconductor material with a non-uniform spectral response, the non-uniform spectral response to be combined with a non-uniform spectral response of an optical amplifier to equalize the non-uniform spectral response of the optical amplifier.

15. The method of claim 14 further comprising adjusting one or more of the different Bragg wavelengths of the plurality of Bragg gratings so as to adjust the non-uniform spectral response.

16. The method of claim 14 wherein each of the different portions of the optical beam directed from the plurality of Bragg gratings are reflected from a respective one of the plurality of Bragg gratings.

17. The method of claim 14 wherein said directing the optical beam through the semiconductor material to the plurality of Bragg gratings disposed in the semiconductor material comprises:
   directing the optical beam through the semiconductor material to a first one of the plurality of Bragg gratings, the first one of the plurality of Bragg gratings having a first Bragg wavelength; and
   directing the optical beam through the first one of the plurality of Bragg gratings to a next one of the plurality of Bragg gratings, the next one of the plurality of Bragg gratings having a second Bragg wavelength.

18. The method of claim 14 further comprising:
   splitting the optical beam into a plurality of optical beams, each of the plurality of optical beams having a different wavelength;
   directing each one of the plurality of optical beams to a corresponding one of the plurality of Bragg gratings.

19. The method of claim 18 further comprising recombining the plurality of optical beams having the different wavelengths from each one of the plurality of Bragg gratings into the optical beam directed from the semiconductor material with the non-uniform spectral response.

20. The method of claim 19 wherein said splitting the optical beam into the plurality of optical beams having the different wavelengths comprises demultiplexing the optical beam into the plurality of optical channels, each one of the plurality of optical beams including a different range of wavelengths.

21. The method of claim 20 wherein said recombining the plurality of optical beams having the different wavelengths from each one of the plurality of Bragg gratings comprises multiplexing the different portions of the optical beam directed from each one of the plurality of Bragg gratings into the optical beam directed from the semiconductor material with the non-uniform spectral response.

22. A method comprising:
   directing an optical beam through a semiconductor material to a plurality of Bragg gratings disposed in the semiconductor material, each one of the plurality of Bragg gratings having a different Bragg wavelength;
   directing different portions of the optical beam from each one of the plurality of Bragg gratings in response to the different Bragg wavelengths, wherein the optical beam is directed from the semiconductor material with a non-uniform spectral response;
   splitting the optical beam into a plurality of optical beams, each of the plurality of optical beams having a different wavelength;
   directing each one of the plurality of optical beams to a corresponding one of the plurality of Bragg gratings; and
   recombining the plurality of optical beams having the different wavelengths from each one of the plurality of Bragg gratings into the optical beam directed from the semiconductor material with the non-uniform spectral response.

23. The method of claim 22 wherein said directing the optical beam through the semiconductor material to the plurality of Bragg gratings disposed in the semiconductor material comprises:
   directing the optical beam through the semiconductor material to a first one of the plurality of Bragg gratings, the first one of the plurality of Bragg gratings having a first Bragg wavelength; and
   directing the optical beam through the first one of the plurality of Bragg gratings to a next one of the plurality of Bragg gratings, the next one of the plurality of Bragg gratings having a second Bragg wavelength.

24. The method of claim 22 wherein each of the different portions of the optical beam directed from the plurality of Bragg gratings are reflected from a respective one of the plurality of Bragg gratings.

25. The method of claim 22 wherein said splitting the optical beam into the plurality of optical beams having the different wavelengths comprises demultiplexing the optical beam into the plurality of optical channels, each one of the plurality of optical beams including a different range of wavelengths.

26. The method of claim 25 wherein said recombining the plurality of optical beams having the different wavelengths from each one of the plurality of Bragg gratings comprises multiplexing the different portions of the optical beam directed from each one of the plurality of Bragg gratings into the optical beam directed from the semiconductor material with the non-uniform spectral response.

27. The method of claim 22 further comprising adjusting one or more of the different Bragg wavelengths of the plurality of Bragg gratings so as to adjust the non-uniform spectral response.

* * * * *